June 2, 1936.  W. S. MAGILL  2,042,538
TESTING APPARATUS
Filed Sept. 8, 1933
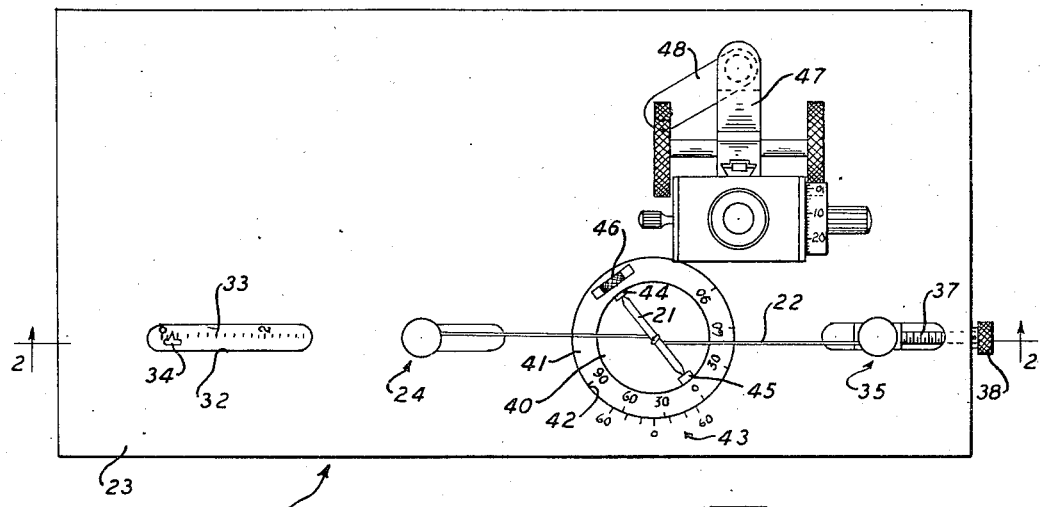
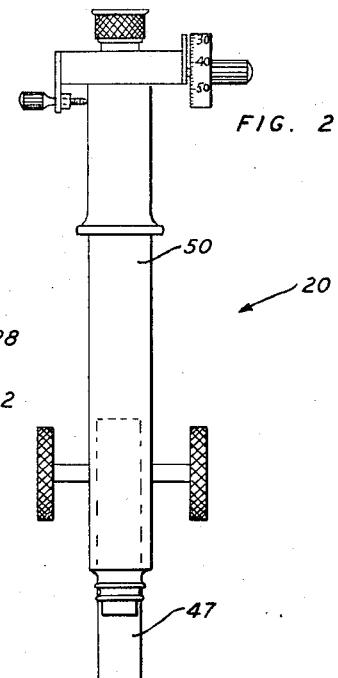
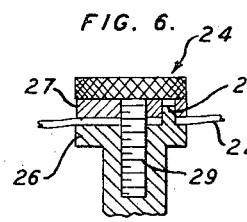
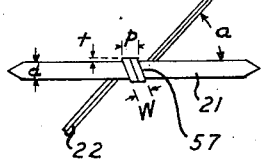
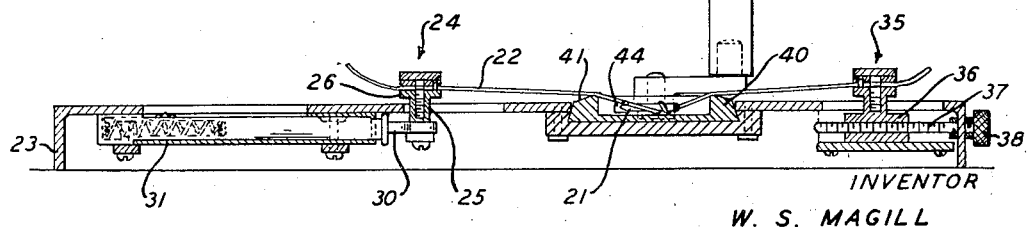
INVENTOR
W. S. MAGILL
BY
E. R. Nowlan
ATTORNEY Patented June 2, 1936

2,042,538

UNITED STATES PATENT OFFICE 2,042,538

TESTING APPARATUS

Wilbur S. Magill, Westfield, N. J., assignor to Western Electric Company, Incorporated, New York, N. Y., a corporation of New York Application September 8, 1933, Serial No. 688,571

8 Claims. (Cl. 33—174)

This invention relates to a testing apparatus and more particularly to an apparatus for obtaining by measurement certain metric data relative to a pair of strands, one of which is wound about the other.

When a core is to be covered by winding a strand spirally thereon it is necessary to have the strand approach the core at a certain constant angle during the winding operation in order that the covering of the core may be without either openings or overlaps. This angle of approach will vary in various ways with the diameter of the core, the width of the strand and other measurable factors.

An object of the invention is to provide an apparatus of the character described which shall be simple and rugged in construction, convenient in use, and which shall enable quick and accurate determination of the metric data in question.

With this and other objects in view, one embodiment of the invention contemplates a microscope with a filar micrometer eyepiece mounted adjustably upon a base provided with means to tension and hold a strand wrapped around a core and further provided with means to adjust the relation of the strand to the core.

Other objects and features of the invention will appear from the following detailed description of one embodiment thereof, taken in connection with the accompanying drawing wherein identical reference numbers are applied to the same parts in the several figures and in which Fig. 1 is a plan view of one embodiment of the invention;

Fig. 2 is a view thereof in vertical section on the line 2—2 of Fig. 1;

Fig. 3 is a detached view of an auxiliary core holding device;

Fig. 4 is a detached view of a standard core section;

Fig. 5 is a detached view of a stranded core section with a two-end strand wound thereon for measurement, and Fig. 6 is a detached enlarged view, in section, of one of the strand gripping devices.

For the practice of the invention as herein disclosed, there may be provided an apparatus generally indicated by the numeral 20, for holding a standard section or sample 21 of core material upon which is wound a sample or section of strand 22. Means are provided as hereinafter described for varying the angle between the sample of the core and the strand, for varying the tension upon the sample of the strand, and for observing and measuring the resultant amounts and variations of various phases of the mechanical and geometrical relationship between the samples of the strand and the core.

The apparatus, as disclosed, comprises a base 23 of any convenient construction upon and in which are mounted the other elements. A strand gripping device 24 is slidably mounted in the base near one end thereof and comprises a support member 25 having a disc shaped head 26 with a central threaded bore. A flat washer 27 eccentrically perforated rests on the head 26 and is held against rotation by an eccentrically located pin 28 mounted in the head and engaging in the perforation of the washer. A jam screw 29 has a threaded shank entering the bore of the support member and serves to press the washer 27 against the head 26 to grip a strand 22 interposed therebetween. The support 25 is mounted in the extremity of a slide 30 which forms the sliding member of an ordinary telescopic spring balance of which the other member 31 is rigidly secured to the base 23. A slot in the top of the base shown at 32 discloses the scale 33 and indicating pointer 34 of the spring balance to view.

Near the other end of the base 23 is slidably mounted a strand tensioning device 35 identical in structure with the device 24. The support 36 of the tensioning device is formed as a nut through which passes an actuating screw 37 having a knurled head 38 and mounted in the base 23 in any approved fashion.

A generally cup shaped observation stage 40 is mounted to be rotatable in the base 23 with its center on the line between the devices 24 and 35. The top of the cup 40 is formed with an outwardly and downwardly sloping circumferential lip 41 the upper face of which is graduated to form an angle indicating scale 42, and a corresponding fixed vernier scale 43 is engraved as shown on the base to cooperate therewith. Complementary sockets 44 and 45 are mounted at diametrically opposite points in the substantially vertical peripheral wall of the cup to receive the extremities of the standard core section 21. One of these sockets is preferably radially adjacent to the zero point of the graduated scale 42. One of these sockets, preferably the last mentioned, is fixed in the cup wall. The other is radially slidable, having a threaded tang extending radially out from its rear which coacts with a corresponding threaded nut 46 mounted to extend partly through a tangentially directed slot in the lip 41.

Near one side of the base 23, or in any convenient and appropriate location thereon, is mounted a substantially vertical standard 47 curving slightly to extend over the cup and carrying a microscope of approved conventional construction. The standard 47 is mounted to be adjustably movable both lengthwise and sidewise relatively to the base to enable the microscope carried thereby to cover substantially any part of the whole area within the rim of the cup as may be required. As disclosed this is effected by mounting the standard 47 pivotally on the outer end of a rotatable member 48, itself pivoted on the base 23.

The microscope 50, having an optical system of characteristics suited to the purpose in hand has its ocular provided with a rotatable filar micrometer eyepiece or other measuring device of well known nature and construction.

A standard core section 21 is a cylinder of hard rigid material with its ends pointed or otherwise shaped to center themselves in the sockets 44 and 45. Such a standard core section will be made of a diameter equal to that of a core to be wound in practice. In general such a standard section is practically preferable to a piece of the actual core itself as the core materials may be too soft or flexible for use in the sockets. However to provide for making observations on pieces of actual cores an auxiliary yoke 51 may be provided having external bearing members 52 adapted to be supported in the sockets 44 and 45, and having means thereon such as the recesses 53 and jam screws 54 to hold an actual core section or sample 55 in alignment with the sockets. Ordinarily a plurality of standard core sections of graduated diameters will be provided for use interchangeably.

Textile strands to be wound as insulation on metal conductors are usually obtained in the market in "cops" or "tubes". The strand wound in such a cop may comprise one or a plurality of elemental filaments known as "ends". In a "tube" having more than one "end", these are associated together by "doubling", not by spinning; that is they lie parallel with each other in the strand and do not twist around each other. When such a multiple end strand is wound as insulation on a cylindrical conductor the several ends in the strand flatten out into a band or ribbon as at 57 and the strand must approach the conductor in the winding operation at such an angle that successive turns of the resultant helical wrapping will touch at their edges without gaps between, and without overlap. The angle of approach to achieve this result is evidently primarily a function of the width of the band or ribbon and of the diameter of the core around which the band is being wrapped. If the core were perfectly rigid and the band unvarying in width and of inextensible material, the simple equation (1) $$a = \arcsin \frac{w}{\pi(d+t)}$$

where $a$ is the angle of approach, $w$ is the width of the band perpendicularly to its edges, $t$ is the radial thickness of the band, and $d$ is the diameter of the core, would give the required angle of approach, and (2) $$p = w \sec a$$

where $p$ is the pitch of the wrapping, i. e. the width of the wrapped band measured along an element of the cylindrical core surface, would give the advance of the wrapping along the core per turn. A wrapping with a single end strand would have definite fixed values of $w$, $p$, and $a$ on a core of given diameter $d$, and the values of $w$ and $p$ on the same core for multiple end wrappings would be simple integral multiples of the corresponding values for the single end wrapping.

In practice, however, the conditions above are not fulfilled, the cores are not rigid although substantially so, the material of the wrapped band is somewhat elastic and its cross sectional area will vary slightly with the source of supply and from time to time.

In the past it has been customary in some cases to determine the angle of approach in any given case by cut and try methods involving preliminary waste of time, material and labor and without even then obtaining reliable data by which to judge whether a type of wrapping which will be both completely satisfactory and of minimum cost in labor as well as in material has been chosen.

A prime object of the present invention is to provide means for the determination of $w$, $p$, $d$, $t$, and $a$ directly by measurement in the apparatus illustrated.

A standard section 21 corresponding in diameter to the particular core to be wound is placed in the sockets 44 and 45, or a piece of the actual core strand itself is mounted in the yoke 51 and this placed in position in the sockets. A sample piece of the textile strand to be used for winding is then wound at one end around the shank of the screw 29 between the washer 27 and the head 26 of the strand gripping device 24 and clamped in place by turning the screw down. The strand is carried down into the cup, one or more times, around the core 21, up, and out to the tensioning device 35, drawn gently taut and clamped in the device 35 in the same way as in the device 24. Manipulation of the knurled head 38 while observing the scale 33 and pointer 34 will then impose the desired tension on the strand.

The microscope is now adjusted to bear and focus upon the wrap of the strand around the core. The cup 40 is then rotated in the base until the strand and the core assume the desired relation to each other. The values of $w$, $p$, $d$ and $t$ may then be determined by direct observation and measurement, by means of the filar micrometer eyepiece of the microscope, and the value of the angle $a$ by manipulation of the cup 40 and readings taken from the scale 42 and vernier 43.

The embodiment of the invention herein disclosed and described is illustrative merely and may be modified and departed from in many ways without departing from the scope and spirit of the invention as pointed out in and limited only by the appended claims.

What is claimed is:

1. In an apparatus for determining at the winding point metric data relating to a strand wound about a core strand, means to support a sample of a core strand, and means to hold and tension a sample of a strand wound around the core sample.

2. In an apparatus for determining at the winding point metric data relating to a strand wound about a core strand, adjustable means to support a sample of a core strand, and adjustable means to hold a sample of the strand wound around the core strand sample and to impose a predetermined tension upon the strand sample wound therearound.

3. In a measuring apparatus, in combination, means to support a sample of a core strand, means to impose a tension upon a sample of a strand wound around the core strand sample, and means to measure metric features of the core sample and strand sample.

4. In a measuring apparatus, in combination, means to interchangeably support a sample of a core strand, adjustable means to impose a predetermined tension upon a sample of a strand wound around the core strand sample, and means to measure metric features of the core sample and strand sample at the winding point.

5. In an apparatus for determining at the winding point metric data relating to a strand wound about a core strand, a base, a stage rotatably mounted therein, means on the stage to hold a sample of a core strand, and means mounted on the base to hold and tension a sample of a strand wound around the core strand sample.

6. In a measuring apparatus, a base, an adjustable stage rotatably mounted therein, means on the stage to interchangeably support a sample of a core strand, means mounted on the base to hold a sample of a strand wound around the core strand sample and adjustable to impose a predetermined tension thereupon, and means to measure metric features of the core strand sample and strand sample at the winding point.

7. In an apparatus for determining metric data relative to a strand, a base, a stage rotatably mounted therein, means to measure angular displacements of the stage relative to the base, and means on the base to hold and tension a strand across the stage for observation thereon.

8. In an apparatus for determining metric data relative to a strand, a base, a stage rotatably mounted therein and comprising a cup shaped body having a rim extending above the surface of the base, and means on the base to hold and tension a strand across the rim of the stage for observation thereon.

WILBUR S. MAGILL.